(12) United States Patent
Lock

(10) Patent No.: US 10,107,263 B2
(45) Date of Patent: Oct. 23, 2018

(54) METHOD OF MANAGING COMPUTING TASKS IN A WIND FARM

(75) Inventor: Hun Yi Lock, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 842 days.

(21) Appl. No.: 13/992,453

(22) PCT Filed: Nov. 30, 2011

(86) PCT No.: PCT/DK2011/050456
§ 371 (c)(1),
(2), (4) Date: Jul. 15, 2013

(87) PCT Pub. No.: WO2012/076012
PCT Pub. Date: Jun. 14, 2012

(65) Prior Publication Data
US 2013/0289786 A1     Oct. 31, 2013

Related U.S. Application Data

(60) Provisional application No. 61/421,636, filed on Dec. 10, 2010.

(30) Foreign Application Priority Data

Dec. 8, 2010   (DK) ................................ 2010 70534

(51) Int. Cl.
   *F03D 7/04*      (2006.01)
   *H04L 29/08*     (2006.01)
   *G06F 9/50*      (2006.01)

(52) U.S. Cl.
   CPC ............. *F03D 7/047* (2013.01); *F03D 7/048* (2013.01); *G06F 9/5027* (2013.01); *G06F 9/5072* (2013.01); *H04L 67/10* (2013.01); *G06F 2209/503* (2013.01); *Y02E 10/723* (2013.01)

(58) Field of Classification Search
   None
   See application file for complete search history.

(56) References Cited

U.S. PATENT DOCUMENTS

| | | | |
|---|---|---|---|
| 6,009,455 A | 12/1999 | Doyle | |
| 7,515,899 B1 | 4/2009 | Carr et al. | |
| 2008/0118354 A1* | 5/2008 | Jeppesen | F03D 7/0224 416/1 |
| 2009/0309361 A1 | 12/2009 | Jurkat | |
| 2010/0135788 A1 | 6/2010 | Qu | |
| 2010/0280673 A1* | 11/2010 | Woste | G05B 19/0428 700/287 |

(Continued)

OTHER PUBLICATIONS

International Search Report, PCT/DK2011/050456, dated Mar. 8, 2012.

(Continued)

*Primary Examiner* — Sean Shechtman
(74) *Attorney, Agent, or Firm* — Patterson + Sheridan, LLP

(57) ABSTRACT

A method of managing computing tasks in a wind farm is provided. The method comprises determining the status of a plurality of wind turbines in the wind farm, determining available computing resources based on the status of the plurality of wind turbines, and allocating a portion of the computing tasks to the available computing resources for processing.

19 Claims, 5 Drawing Sheets

(56) References Cited

U.S. PATENT DOCUMENTS

2010/0332657 A1* 12/2010 Elyashev ............ H04L 67/1002
709/226
2011/0145811 A1* 6/2011 Middendorf ............ F03D 7/047
717/178

OTHER PUBLICATIONS

Search Report and Written Opinion, Danish Application No. PA 2010 70534, dated Oct. 3, 2011.
Bansal, S. "A review on power system control centres", International Conference on Business and Information, Jul. 11-13, 2007, Tokyo, Japan, Paper No. 7804.

* cited by examiner

METHOD OF MANAGING COMPUTING TASKS IN A WIND FARM

FIELD OF THE INVENTION

The invention relates generally to a wind farm, and more specifically to a method of managing computing tasks in a wind farm.

BACKGROUND OF THE INVENTION

A wind farm typically includes a plurality of wind turbines and a power plant controller (PPC). Data is communicated among the wind turbines and the PPC via a monitoring and control network. The PPC may also send control signals for controlling the operation of the wind turbines via the network.

The data circulating in the network includes data from various sensors in the wind turbines such as grid voltage, gearbox vibration levels, ambient temperature, wind speed, etc. Such sensor data are typically processed to form meaningful information and the processed data is used to control the operation of the wind turbines to produce optimal power output or to keep loads within an acceptable level.

The processing of data requires computing resources. Such computing resources are provided in the wind farm by the PPC and/or the controllers in each wind turbine. Due to the large amount of data to be processed and also the importance of prompt processing of time-critical data for control of the turbines, the computing resources in the wind farm are very valuable.

At any time, not all the wind turbines in the wind farm are operating. For example, some of the wind turbines may be shut down for maintenance. In this case, the computer resources of the turbines may not be utilized by the wind farm, and hence wasted.

SUMMARY OF THE INVENTION

According to a first aspect of the invention, a method for managing computing tasks in a wind farm is provided. The method comprises determining the status of a plurality of wind turbines in the wind farm, determining available computing resources based on the status of the plurality of wind turbines, and allocating a portion of the computing tasks to the available computing resources for processing.

The computing tasks include but not limited to processing of data obtained from sensors, analyzing the processed data, determining what actions to take based on the sensor data or processed data and providing control signals for operating the wind turbines in a specific manner. For example, the vibration sensor data of a gearbox of a turbine may be analyzed by a controller of the turbine to determine the vibration level of the gearbox. Depending on the vibration level, the controller determines a desired power output from the generator of the turbine. Thereafter, the controller determines a desired pitch angle for the turbine blades and generates a pitch control signal to control the pitch angle of the turbine blades to the desired pitch angle, thereby controlling the power output of the generator. All these tasks are considered as computing tasks performed in a wind turbine. These computing tasks may be performed by controllers in the turbines or by a central controller outside the turbines (also known as the power plant controller).

Based on the status of the wind turbines in the wind farm, it is determined how many controllers in the wind farm are up and running, and hence the computing resources of the wind farm can be determined. The available computing resources can then be determined from information such as how much of the computing resources have been used currently or how much of the computing resources have not been utilized.

The determined available computing resources are then used to handle some or all of the computing tasks. By using these computing resources to handle the current computing tasks, the current computing tasks in the wind farm can be completed in a shorter time as they can be processed in parallel. This improves the overall efficiencies of the computing processes in the wind farm. Also, the valuable computing resources in the wind farm are not wasted.

According to an embodiment, determining the status of the plurality of the wind turbines includes determining the number of wind turbines that are not operating.

The wind turbines are not operating when they are shut down for maintenance. During maintenance, the controller of the turbine which has been shut down for maintenance is not handling any computing tasks. Therefore, the computing resources of this controller are available computing resources which may be used for handling other computing tasks from other turbines.

The wind turbines may also be shut down for other reasons such as component faults. For example, if the gearbox of a wind turbine fails, the turbine is shut down. Similarly, the computing resources of the controller of the turbine are available computing resources which may be used for handling other computing tasks from other turbines. By determining the number of wind turbines in the wind farm that are not operating, the available computing resources of the wind farm can be determined.

Alternatively or additionally, how much computing resources of each wind turbine is used or unused is determined. For example, if 50 percent of the computing resources of the wind turbine are used, the other 50 percent of the computing resources of that wind turbine are available.

According to an embodiment, the method further includes determining one or more wind turbines having the available computing resources, sending data corresponding to the portion of the computing tasks to the one or more wind turbines having the available computing resource, processing the computing tasks by the one or more wind turbines, and delivering the processed data from the one or more wind turbines.

Computing tasks are handled using the available computing resources from the wind turbines. Data relating to the computing tasks that need to be processed are sent to the wind turbines having the available computing resources. After the data have been processed in the wind turbine having the available computing resources, the processed data are delivered from the wind turbine back to where the computing tasks originated from. If the computing tasks are from the other wind turbines, the processed data are sent back to the other wind turbines.

According to an embodiment, the computing tasks include load aerodynamic control (LAC) tasks for controlling the operation of the wind turbines to reduce loads exerted thereon. In another embodiment, the computing tasks include converter control tasks for controlling the operation of power converters in the wind turbines.

Examples of LAC tasks include determining loads exerted on a component of the wind turbine, for example on the blades of the wind turbine, and controlling the operation of the wind turbine in order to keep the loads within acceptable limits. Examples of converter control tasks include determining generator power or grid voltages and controlling the operation of the power converters so that the output power from the generator and/or the power converters are within a desired range.

It should be noted that other types of computing tasks are possible in other embodiments, such as detecting the ambient temperature and controlling the components of the wind turbine, etc.

According to an embodiment, one or more of the steps of the method is performed by a central controller in the wind farm. The central controller is a controller outside the wind turbines. An example of the central controller is a power plant controller (PPC) which receives monitoring data, processes the monitoring data and sends control signals to the wind turbines for controlling the operation of the wind turbines. The PPC may then be configured to include performing one or more steps of the method according to the embodiment.

According to an embodiment, one or more of the steps of the method is performed by a turbine controller of a wind turbine. A wind turbine typically includes at least one turbine controller for controlling the operations of the wind turbine such as power output, pitching of turbine blades, operation of power converter, etc. According to the embodiment, the turbine controller is configured to include performing one or more steps of the method.

According to a further embodiment, a replacement controller is used to monitor the status of the turbine controller which performs the steps of the method. If the status of the turbine controller shows that the turbine controller is not available, the replacement takes over the functions of the turbine controller. The replacement controller may be the central controller or a turbine controller of another wind turbine. There may be situations where the turbine controller performing the method is unable to perform the method, for example due to fault or failure of the turbine controller, the replacement controller can then perform the steps of the method. This ensures that the management of the computing tasks is still able to continue even if the turbine controller is down.

According to a second aspect of the invention, a wind farm is provided. The wind farm comprises a plurality of wind turbines and a controller. The controller is adapted to determine the status of the plurality of the wind turbines, determine available computing resources based on the status of the plurality of the wind turbines, and allocating a portion of computing tasks to the available computing resources for processing.

According to an embodiment, the controller is further adapted to control the following:

determining one or more wind turbines having the available computing resources, sending data corresponding to the portion of the computing tasks to the one or more wind turbines having the available computing resources, processing the computing tasks by the one or more wind turbines, and delivering the processed data from the one or more wind turbines.

According to an embodiment, the computing tasks include load-aerodynamic control tasks for controlling the operation of the wind turbines to reduce loads exerted thereon. In another embodiment, the computing tasks include converter control tasks for controlling the operation of power converters in the wind turbines.

According to an embodiment, the controller forms at least part of a central controller of the wind farm. In another embodiment, the controller forms at least part of a turbine controller of a wind turbine.

According to an embodiment, the wind farm includes a further replacement controller adapted to monitor the status of the turbine controller, and taking over the functions of the turbine controller if the turbine controller is not available. According to a further embodiment, the replacement controller is part of a turbine controller of another wind turbine.

It should be noted that a person skilled in the art would readily recognize that any feature described in combination with the first aspect of the invention could also be combined with the second aspect of the invention, and vice versa.

According to a third aspect of the invention, a controller in a wind farm comprising a plurality of wind turbines is provided. The controller is adapted to perform the method according to the first aspect of the invention. The controller may form part of the central controller of the wind farm and/or part of a turbine controller of a wind turbine.

It should be noted that a person skilled in the art would readily recognize that any feature described in combination with the first and second aspect of the invention could also be combined with the third aspect of the invention, and vice versa.

BRIEF DESCRIPTION OF THE DRAWINGS

The invention will be better understood with reference to the detailed description when considered in conjunction with the non-limiting examples and the accompanying drawings.

DETAILED DESCRIPTION OF THE INVENTION

Figure 1:
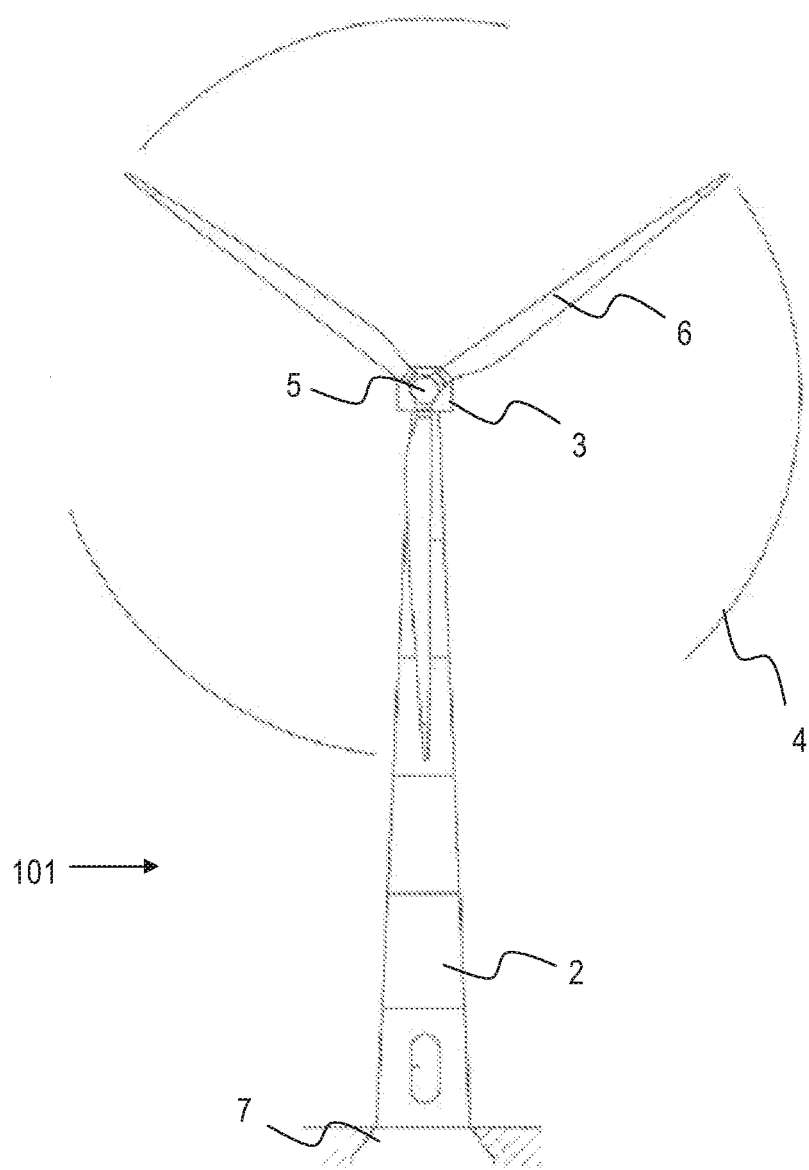
FIG. 1 shows a general structure of a wind turbine.

FIG. 1 shows a general setup of a wind turbine 101. The wind turbine 101 includes a tower 2, a nacelle 3 positioned on top of the tower 2, and a rotor 4 extending from the nacelle 3. The tower 2 is erected on a foundation 7 built in the ground. The rotor 4 is rotatable with respect to the nacelle 3, and includes a hub 5 and one or more blades 6. Wind incident on the blades 6 causes the rotor 4 to rotate with respect to the nacelle 3. The mechanical energy from the rotation of the rotor 4 is converted into electrical energy by a generator (not shown) in the nacelle 3. The electrical energy is subsequently converted into a fixed frequency electrical power by a power converter to be supplied to a power grid.

Although the wind turbine 101 shown in FIG. 1 has three blades 6, it should be noted that a wind turbine may have different number of blades. It is possible to find wind turbines having two to four blades. The wind turbine 101 shown in FIG. 1 is a Horizontal Axis Wind Turbine (HAWT) as the rotor 4 rotates about a horizontal axis. It should be noted that the rotor 4 may rotate about a vertical axis. Such a wind turbine having its rotor rotates about the vertical axis is known as a Vertical Axis Wind. Turbine (VAWT). The embodiments described henceforth are not limited to HAWT having 3 blades. They may be implemented in both HAWT and VAWT, and having any number of blades 6 in the rotor 4.

Figure 2:
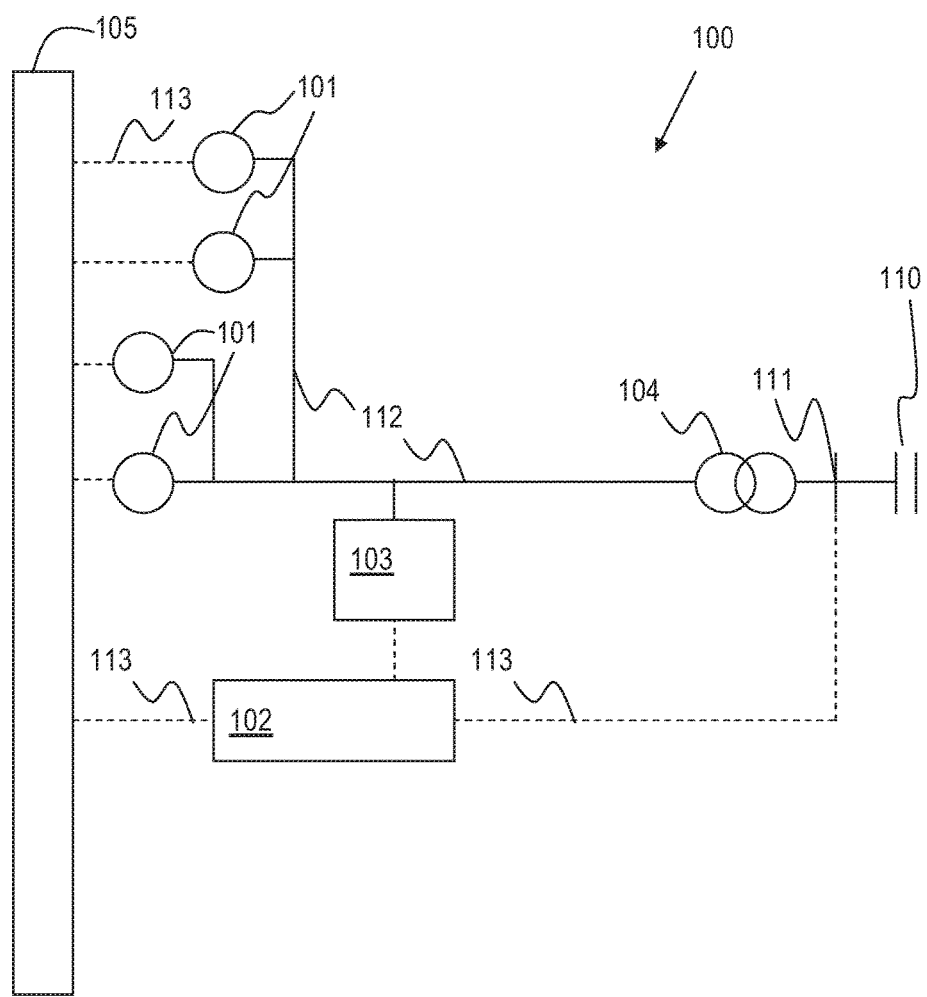
FIG. 2 shows a general layout of a wind park comprising a plurality of the wind turbines.

FIG. 2 shows a general layout of a wind park 100. The wind park 100 includes a plurality of wind turbines 101 (such as the wind turbine shown in FIG. 1), a wind park controller 102, a wind park transformer 104 and a wind park network 105. The wind park 100 is connected to a utility system or grid 110 via power lines 112 and through the wind park transformer 104. The interface point between the wind park 100 and the utility system 110 is called the point of common coupling (PCC) 111. The wind park controller 102 may also be known as a power plant controller. Power produced by the wind turbines 101 are distributed over the power lines 112 and provided to grid 110 via the PCC 111. The wind park transformer 104 steps up or down the voltage from the wind park 100 into a voltage suitable for transmission in the grid 110.

The wind park 100 may further include compensation devices 103. The compensation device is a reactive power generation device used to compensate reactive power of the wind park 100. Examples of the compensation device 103 include but not limited to a thyristor switched capacitor bank and a static VAR compensator (SVC). The reactive power from the compensation device 103 is also delivered to the grid 110 over power lines 112.

The wind park controller 102 generally fulfils a plurality of control functions. For example, the wind park controller 102 may collect different types of data which characterizes the current state of the wind turbines 101 or components thereof, and in response thereto control the operation of the wind turbines 101. The wind turbines 101 communicate with the controller 102 through the wind power plant network 105 using control lines 113 as shown as dotted lines in FIG. 2. The signals communicated between the controller 102 and the wind turbines 101 may include power output signal, turbine status, power reference, turbine command, etc. The controller 102 is also connected to the PCC 111 via control line 113. This allows the controller 102 to detect power parameters such as voltage and current levels at the PCC 111.

It should be noted that the layout of the wind park 100 shown in FIG. 2 is only an example, and the invention is not restricted to the exact layout of the wind park shown in FIG. 2. For example, although 4 wind turbines 101 are shown in the wind park 100, it is possible that the wind park includes more or less than 4 wind turbines 101. It is also possible that the wind park only has one wind turbine 101. Similarly, the wind park 101 may include more than 1 compensation devices in other examples.

Figure 3:
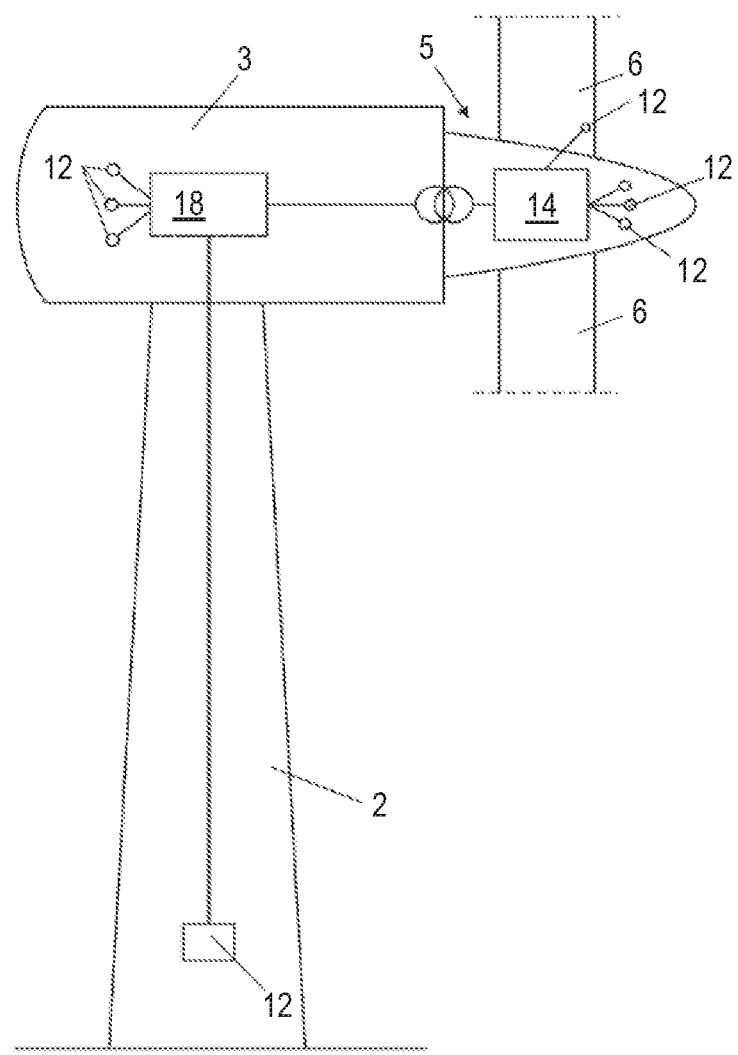
FIG. 3 shows a general arrangement of controllers and sensors inside the wind turbine.

FIG. 3 generally illustrates a control system of a wind turbine 101. The wind turbine 101 includes one or more controllers such as a nacelle-based controller 18 within the nacelle 3 and a hub-based controller 14 and in communication with each other via an interface between the stationary and the rotating parts. The controllers 14, 18 receive input from sensors or measuring units 12 placed in different parts of the wind turbine such as in the nacelle 3, in the blades 6 or the tower 2. The sensors 12 may provide input data to the nacelle-based controller 18 related to e.g. power output of the wind turbine, wind direction, wind velocity and/or other parameters. The hub-based controller 14 receives input data from a plurality of sensors 12 arranged to measure e.g. loads on the blades 6 (i.e. blade bending), blade oscillation, rpm, acceleration, velocity or load of the tower 2 and/or other parameters. The sensors 12 may be provided for individual purposes, or some of them may replicate others. For example, two of the sensors 12 may be provided for measuring blade load, whereby one of the sensors 12 is provided to take over if the other fails.

For example, the hub-based controller 14 comprises a pitch controller for determining a pitch reference value for controlling the pitch of the blades 6. The input from the sensors 12 is processed in a processor of the hub-based controller 14 to yield an operational parameter (such as the thrust coefficient or the minimum pitch limit value), and thereby determine whether a modified control strategy should be followed which is then communicated to the pitch controller. The pitch controller is then configured to optionally modify the pitch reference and control the pitch of the turbine blades accordingly.

The nacelle-based controller 18 and the hub-based controller 14 may also be known as turbine controllers in general. The two controllers 14, 18 may also provide redundancies for each other. For example if one of the controllers fails, the other controller may take over the functions of the failed controller in addition to its own functions. In other embodiments, the turbine 101 may include a tower-based controller (not shown) located in the tower 2 of the wind turbine 101.

Figure 4:
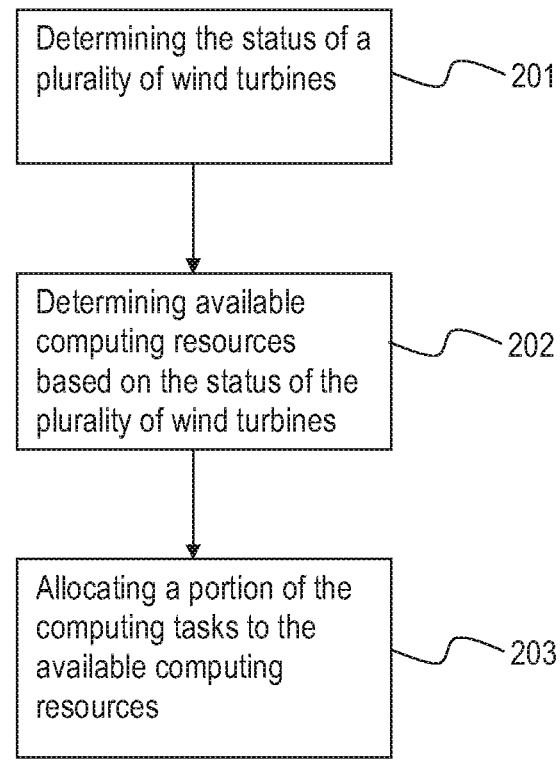
FIG. 4 shows a flow-chart of the method for managing computing tasks in a wind park according to an embodiment of the invention.

FIG. 4 shows a flow-chart of the method for managing computing tasks in the wind park according to an embodiment. Step 201 includes determining the status of a plurality of wind turbines in a wind farm. In an embodiment, it is checked whether the wind turbines 101 in the wind park 100 are operating and/or how much of the computing resources is used or unused. The status of the wind turbine may be sent by the turbine controller or a program running in the wind turbine. This status may be broadcasted directly by the wind turbine via the wind park network 105, or sent to the PPC 102 to be broadcasted. The sending or broadcasting of the status may be done at predefined time.

Step 202 includes determining available computing resources based on the status of the wind turbines. In an embodiment, based on the number of turbines 101 which are not operating, it is determined whether the computing resources of these non-operating wind turbines 101 are available. The computing resources of the non-operating wind turbines 101 are not available if the controllers 14, 18 are down or failed. If the wind turbines 101 are not operating because they are shut down for maintenance, the computing resources of the controllers may still be available. Therefore, the computing resources of the controllers of non-operating turbines which are under maintenance can be determined as available computing resources according to the embodiment.

In another embodiment, it is determined which of the turbines are not utilizing all of their computing resources. For example, if it is determined that all of the turbines are only utilizing 60 percent of their computing resources, the other 40 percent of the computing resources can be determined as available computing resources according to the embodiment.

Step 203 includes allocating a portion of the computing tasks in the wind farm to the available computing resources. The controllers of the wind turbines 101 would normally be handling the computing tasks related to the respective wind turbines 101. According to an embodiment, some or all of these computing tasks can be handled by the available computing resources of the non-operating wind turbines. Therefore, the unused computing resources in the wind farm is not wasted, but is utilized according to an embodiment of the invention. As a result, the wind farm is now able to handle more tasks, and also complete these computing tasks within a shorter time.

Computing tasks in a wind farm includes but not limited to load-aerodynamic control, power converter control, safety functions, regulating power output according to specific requirements/requests (e.g. grid code requirements, curtailment), grid fault management and condition monitoring. In an embodiment, computing tasks relating to safety and emergency situations in the wind turbines are only handled locally by the respective turbines. Such computing tasks relating to safety are given higher priority to the other computing tasks, and hence will be processed first.

The method for managing computing tasks according to the embodiments may be implemented for the whole wind farm, or for a cluster of wind turbines in the wind farm. The wind turbines in the wind farm may be grouped into different clusters with each cluster implementing a separate method of managing computing tasks according to the embodiments.

The wind park controller 102 may be the controller implementing the method in one embodiment. In other words, the wind park controller 102 determines the status of the wind turbines, determines the available computing resources and allocates some of the computing tasks to the available computing resources for processing. It is also possible that the method is implemented by one of the turbine controllers 14, 18 of the wind turbine 101. To provide redundancy to the turbine controller, a replacement turbine controller may be provided to monitor the status of the turbine controller. If the replacement turbine detects that the turbine controller is down, it takes over the function of the turbine controller in implementing the method. This ensures that the management of the computing tasks is continued. The replacement controller may be a turbine controller 14, 18 of another wind turbine 101. A further replacement controller of another wind turbine may be used to monitor the status of the replacement controller in another embodiment.

It is also possible to implement the method for managing computing tasks using a remote computer or a Supervisory Control and Data Acquisition (SCADA) system. The remote computer or the SCADA is connected to the wind farm remotely via a data network such as the Internet. In this embodiment, data relating to the status of the wind turbines are sent to the remote computer or the SCADA via the Internet. The allocation of the available computer resources for the computing tasks is then remotely controlled from the remote control or SCADA.

Figure 5:
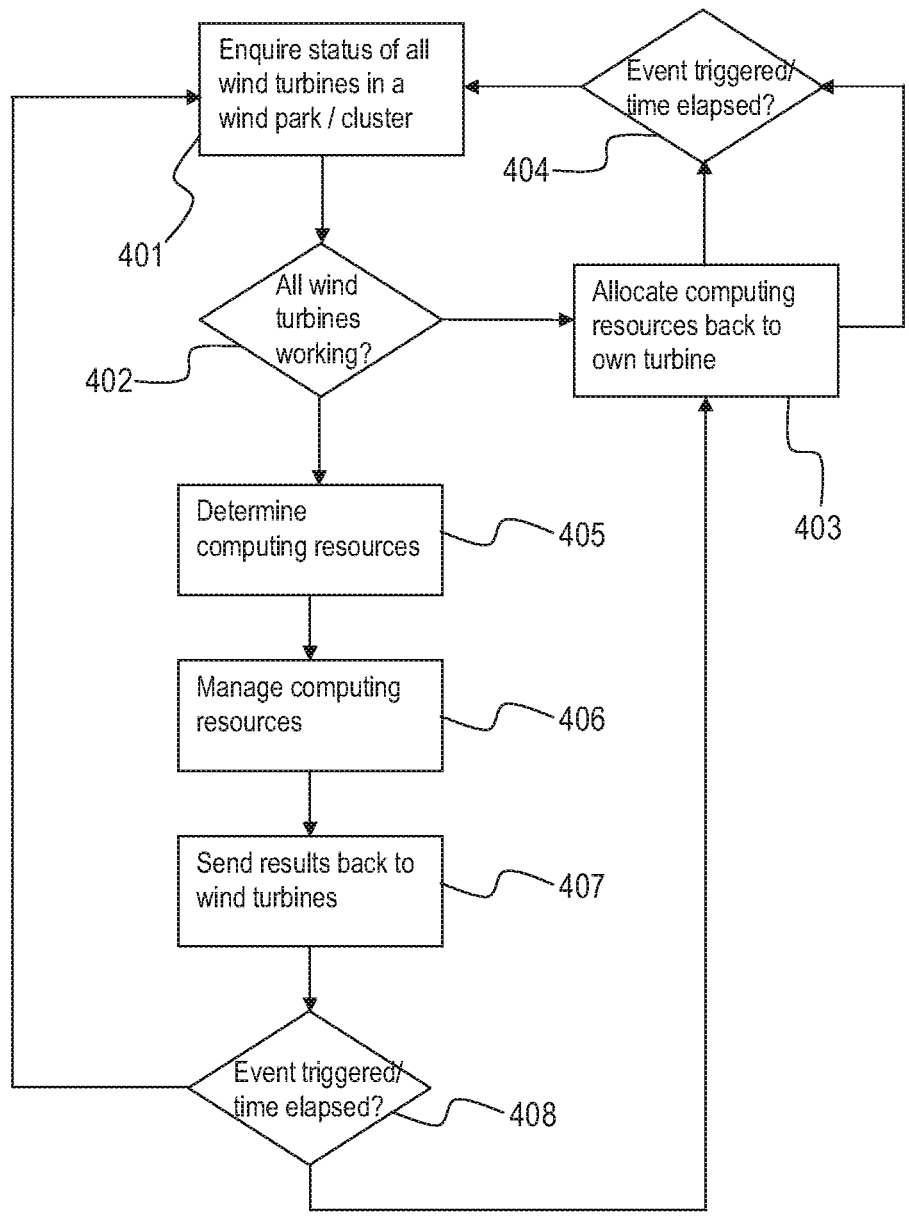
FIG. 5 shows a flow-chart of an exemplary method for managing computing tasks in a wind park according to an embodiment of the invention.

FIG. 5 shows a flow-chart of an exemplary method for managing computing tasks in the wind park according to an embodiment. At step 401, the wind park controller enquires the status of the wind turbines 101 in the wind park. It is checked at step 402 whether all the wind turbines 101 are working. If all the wind turbines 101 are working, all the computing resources of each turbine are allocated back to the respective wind turbines for processing the computing tasks thereof in step 403.

It is checked at step 404 whether an event is triggered or a predefined time has elapsed. After the predefined time has elapsed, the statuses of the wind turbines are re-determined in step 401. Thus, the available computing resources of the wind farm are refreshed periodically. The predefined time should preferably be long enough for a predefined number of computing tasks to be completed. Alternatively or additionally, the wind turbine statuses are re-determined after a specific event is triggered, such as a change in status of any of the wind turbines. Examples of such events includes turbine shut down for maintenance, stopping of turbines due to safety issues, change of power production, etc.

It not all the wind turbines 101 are working at step 402, the available computing resources is determined at step 405. Specifically, it is determined how many wind turbines need to be supported for their computing tasks, and how many turbine controllers are available to process the computing tasks. For example, it may be determined that the turbine controller of one wind turbine has failed and one wind turbine is shut down for maintenance. Hence, the computing resources of the turbine that is shut down for maintenance can be allocated to process the computing tasks of the wind turbine with the failed controller. In this case, the computing tasks of the wind turbine with the failed controller are sent to the wind turbine which is on maintenance for processing at step 406. When the computing tasks are completed, the results of the completed tasks are sent from the wind turbine on maintenance back to the wind turbine with the failed controller at step 407. The flow of the data of the computing tasks and the results can be managed by the wind park controller 102. Alternatively, it can be managed by a turbine controller of another wind turbine. It is checked at step 408 whether a specific event is triggered or a predefined time has elapsed. If yes, the process starts again at step 401.

In another example, it is determined at step 402 that the turbine controller of one wind turbine has failed. At step 405, the wind park controller 102 allocates the computing tasks of the wind turbine with the failed controller to the other wind turbines equally. In other words, the turbine controllers of the other wind turbines now handle their own computing tasks and also additionally part of the computing tasks from the turbine with the failed controller. This is possible because normally a turbine controller runs at about 80% of its capacity when handling its own turbine's computing tasks. By handling some of the computing tasks from the other turbine, the turbine controller may now run at, perhaps 90% of its capacity. At step 406, the computing tasks of the wind turbine with the failed controller are sent to the other wind turbines for processing. When the computing tasks are completed, the results of the completed tasks are sent from the wind turbines back to the wind turbine with the failed controller at step 407. Similarly, the flow of the data of the computing tasks and the results can be managed by the wind park controller 102. Alternatively, it can be managed by a turbine controller of another wind turbine.

It should be emphasized that the embodiments described above are possible examples of implementations which are merely set forth for a clear understanding of the principles of the invention. The person skilled in the art may make many variations and modifications to the embodiment(s) described above, said variations and modifications are intended to be included herein within the scope of the following claims.

What is claimed:

1. A method of managing computing control tasks in a wind farm comprising a plurality of wind turbines, the method comprising:
   upon determining that computing resources on a first wind turbine of the plurality of wind turbines in the wind farm are underutilized:
      identifying computing resources processing computing control tasks on a second wind turbine of the plurality of wind turbines;
      prioritizing the computing control tasks based on a type of wind turbine control system corresponding to each of the computing control tasks; and allocating, based on the priority of the computing control tasks, a first portion of the computing control tasks from the second wind turbine to the underutilized computing resources on the first wind turbine for processing, wherein computing resources on the second wind turbine process a second portion of the computing control tasks in parallel with the computing resources on the first wind turbine processing the first portion of the computing control tasks, wherein the first and second portions of the computing control tasks relate to control of the second wind turbine.

2. The method of claim 1, wherein determining that the computing resources on the first wind turbine of the plurality of wind turbines are underutilized comprises determining the first wind turbine is at least one of shut down for maintenance, shut down due to failure of a component of the first wind turbine, and capable of processing additional computing control tasks based on operating conditions of the first wind turbine.

3. The method of claim 1, further comprising:
sending data corresponding to the first portion of the computing control tasks to multiple wind turbines having available computing resources;
processing the first portion of the computing control tasks by the multiple wind turbines; and
delivering processed data corresponding to the first portion of the computing control tasks from the multiple wind turbines to the second wind turbine.

4. The method of claim 1, wherein the computing control tasks comprise at least one of controlling the operation of a sub-system in the second wind turbine and load-aerodynamic control tasks for controlling the operation of the second wind turbine to reduce loads exerted thereon.

5. The method of claim 1, wherein the computing control tasks comprise converter control tasks for controlling the operation of power converters in the wind turbines.

6. The method of claim 1, wherein at least one of (i) identifying the computing resources processing computing control tasks on the second wind turbine and (ii) allocating the first portion of the computing control tasks from the second wind turbine to the underutilized computing resources on the first wind turbine for processing is performed by a central controller in the wind farm.

7. The method of claim 1, wherein at least one of (i) identifying the computing resources processing computing control tasks on the second wind turbine and (ii) allocating the first portion of the computing control tasks from the second wind turbine to the underutilized computing resources on the first wind turbine for processing is performed by a turbine controller of the first or second wind turbine.

8. The method of claim 7, further comprising monitoring the status of the turbine controller, and upon determining the turbine controller is not available, providing a replacement controller to perform the functions performed by the turbine controller.

9. A controller in a wind farm comprising a plurality of wind turbines, the controller is adapted to perform the method according to claim 1.

10. The controller of claim 9, wherein the controller forms at least part of a central controller of the wind farm.

11. The controller of claim 9, wherein the controller forms at least part of a turbine controller of the first or second wind turbine.

12. A wind farm comprising:
a plurality of wind turbines; and
a controller, wherein the controller is configured to:
upon determining that computing resources on a first wind turbine of the plurality of wind turbines are underutilized:
identify computing resources processing a plurality of computing control tasks on a second wind turbine of the plurality of wind turbines;
prioritizing the computing control tasks based on a type of wind turbine control system corresponding to each of the computing control tasks; and
allocate, based on the priority of the computing control tasks, a first portion of the computing control tasks from the second wind turbine to the underutilized computing resources on the first wind turbine for processing, wherein computing resources on the second wind turbine process a second portion of the computing control tasks in parallel with the computing resources on the first wind turbine processing the first portion of the computing control tasks, wherein the first and second portions of the computing control tasks relate to control of the second wind turbine.

13. The wind farm of claim 12, wherein the controller is further configured to:
send data corresponding to the first portion of the computing control tasks to multiple wind turbines having available computing resources;
process the first portion of the computing control tasks by the multiple wind turbines; and
deliver processed data corresponding to the first portion of the computing control tasks from the multiple wind turbines to the second wind turbine.

14. The wind farm of claim 12, wherein the computing control tasks comprise at least one of controlling the operation of a sub-system in the second wind turbine and load-aerodynamic control tasks for controlling the operation of the second wind turbine to reduce loads exerted thereon.

15. The wind farm of claim 12, wherein the computing control tasks comprise converter control tasks for controlling the operation of power converters in the wind turbines.

16. The wind farm of claim 12, wherein the controller forms at least part of a central controller of the wind farm.

17. The wind farm of claim 12, wherein the controller forms at least part of a turbine controller of the first or second wind turbine.

18. The wind farm of claim 17, further comprising a replacement controller configured to:
monitor the status of the turbine controller, and
upon determining the turbine controller is not available, perform the functions performed by the turbine controller.

19. The wind farm of claim 18, wherein the replacement controller is part of a turbine controller of another wind turbine.

* * * * *